Feb. 3, 1953 D. R. ANDREWS 2,627,596

DRIVING APPARATUS

Filed May 31, 1950

Inventor

DALLAS R. ANDREWS

By Marcus A. Rabkin

Attorney

Patented Feb. 3, 1953

2,627,596

UNITED STATES PATENT OFFICE 2,627,596

DRIVING APPARATUS

Dallas R. Andrews, Collingswood, N. J., assignor to Radio Corporation of America, a corporation of Delaware Application May 31, 1950, Serial No. 165,274

6 Claims. (Cl. 318—318)

Figures 1, 2, 3:
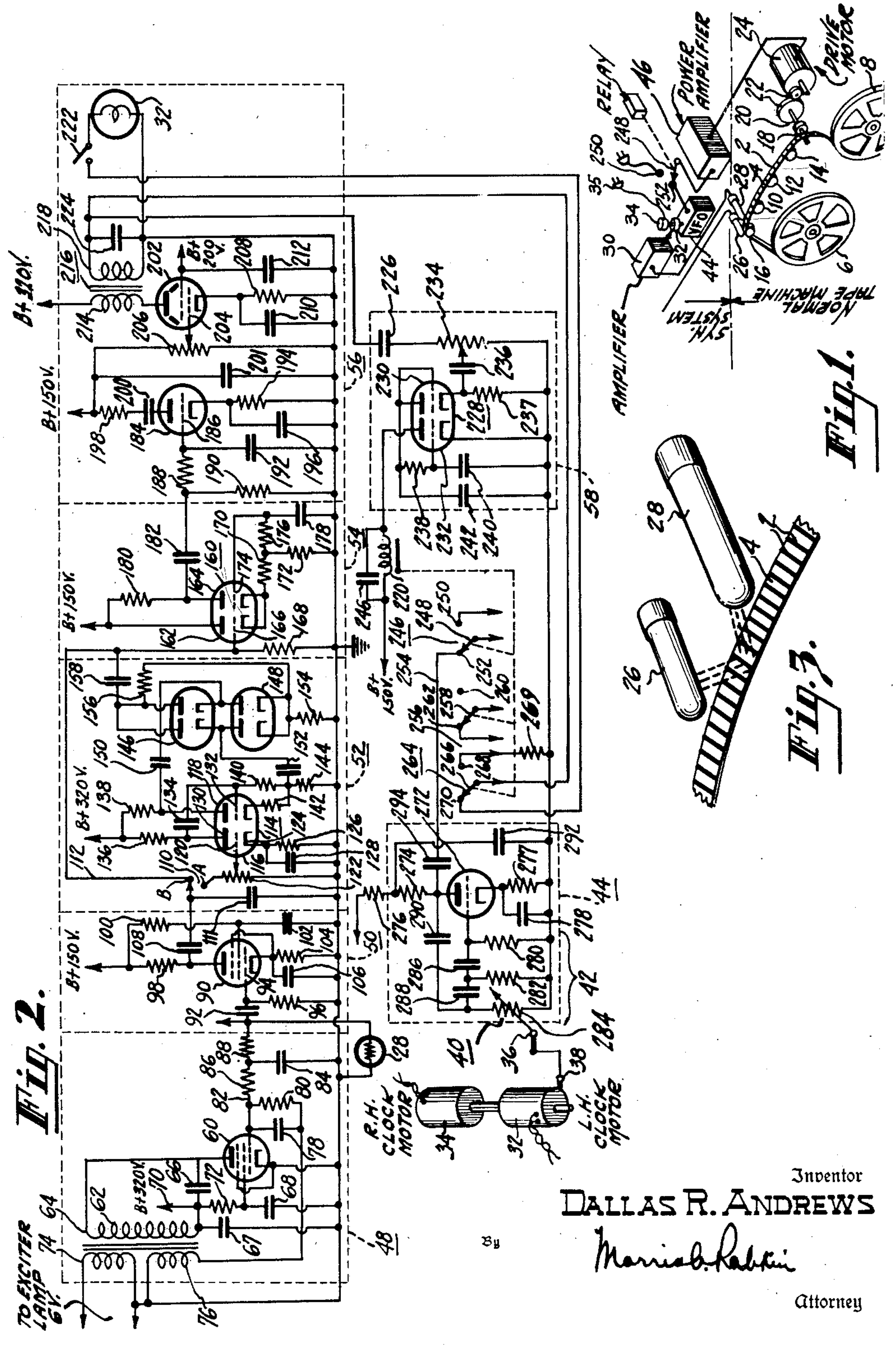

The present invention relates to apparatus for driving a medium, such as a tape or wire, past a reference point. Tape, such as is used for recording sound, is usually made of paper or a synthetic resin, coated with a magnetic material. The tape is subject to stretching due to mechanical stress placed upon it and may also change in linear dimensions because of expansion and contraction caused by changes in temperature and humidity. If sound is recorded on this tape when it has a certain length and the recorded sound is later reproduced by running the tape over a magnetic transducer head after the tape has changed in dimensions, the sound will be distorted unless the speed at which the tape passes over the transducer has been compensated to take care of the dimensional changes.

Other than the problem of distortion, broadcasting stations desiring to use this tape in the broadcasting of recorded programs are usually faced with a timing problem. Broadcast programs must often be timed to within a second or even less. Hence, the length of time it will actually take to run a certain recorded program must be known with great accuracy. Merely running a recording tape at constant speed is not sufficient since the tape may have lengthened considerably since the program was recorded on it. It becomes necessary, therefore, to be able automatically to increase the speed of passage of stretched portions of tape and diminish the velocity of those portions which have contracted, so that the playing time will be as nearly as possible identical with the recording time.

Tape adapted to be controlled in velocity so that compensation may be made for linear dimensional changes was described in co-pending application, Serial No. 23,884, of Earl E. Masterson, filed April 29, 1948. The particular form of tape referred to is one having visible stripes printed on the back. These stripes are spaced so that they pass a given point at some desired frequency of, say, 60 per second when the tape is running at its normal recording or playback velocity.

Apparatus is also disclosed in the said co-pending application for driving the tape and for automatically controlling the speed of the drive means so that the reference marks on the tape continue to pass at the desired frequency even though dimensional changes occur in the tape after the sound is recorded thereon. The control apparatus includes photoelectric means for scanning the marks on the tape and for generating a control signal having a frequency equal to the frequency of passage of the marks. The control frequency is compared to a fixed frequency from a standard source of 60 C. P. S. current and the difference in frequencies, if any, used to operate a mechanical differential, the movement of which is, in turn, applied to a variable speed friction drive means for driving the tape.

Although the above described system operates satisfactorily for many purposes, the inherent mechanical defects are sufficient to cause "wows" too noticeable to be tolerated for most broadcasting. The present invention comprises an improvement in the means for controlling the variable speed means for driving the tape such that no "wows" occur in operation. More specifically, the improvement relates to the use of a variable frequency osciliator to generate the signal used to drive the tape-driving motor. The oscillator has a normal output frequency bearing some predetermined relationship to that of the standard source and of the control signal, received from the tape when the tape is running at normal speed. The output frequency is caused to vary in accordance with differences detected between the control signal frequency received from the tape and the standard frequency.

Also included in the invention are means for automatically disconnecting the tape drive means from the variable frequency oscillator during the periods of starting and stopping the tape-driving mechanism when the control frequency drops far below the standard frequency, and for controlling the drive means from the standard frequency source during these periods.

One object of the present invention is to provide improved apparatus for driving a medium in synchronism with a control source.

Another object of the invention is to provide improved means for driving a tape or wire having spaced indicia thereon for indicating the velocity.

Another object of the invention is to provide improved apparatus for driving a magnetic sound recording medium with substantial elimination of "wow" in the reproduced sound.

Another object of the invention is to provide improved apparatus for driving a sound recording medium having reference indicia printed thereon, such that said indicia pass a given point at a substantially constant frequency.

Another object of the invention is to provide improved apparatus for driving a recording medium which is subject to dimensional changes which normally are sufficiently great to affect the quality of reproduction.

Another object of the invention is to provide improved apparatus for driving magnetic recording tape such that the playback time is substantially the same as the recording time regardless of changes in linear dimensions of the tape.

A further object of the invention is to provide improved apparatus for driving a magnetic recording medium having spaced reference indicia thereon such that quality of reproduction is not affected during the starting and stopping periods.

A still further object is to provided apparatus for driving a magnetic recording medium which apparatus can be used interchangeably with tape having spaced reference indicia thereon or with tape having no indicia thereon.

These and other objects will be more apparent and the invention will be more readily understood from the following detailed description including the illustrative drawings of which:

Figure 1 is a diagrammatic illustration, partially in perspective, of the improved apparatus of the present invention, with the circuit portions being indicated in block form, Figure 2 is a diagram of one embodiment of electronic control circuits which may be utilized in the present invention, and Figure 3 is an enlarged detail view of the back of a small segment of recording tape together with light source and photocell.

Referring now to Figure 1, a preferred embodiment of the invention is utilized in connection with a magnetizable medium such as a paper base tape 2 impregnated with a synthetic resin binder and coated with very finely powdered magnetic material. The tape may have spaced indicia 4, in the form of visible transverse stripes, printed on its back. The recording tape may be used in a sound reproducing system which is conventional insofar as it includes a tape storage reel 6 from which the tape is unwound and a take-up reel 8 upon which the tape is rewound after passing over the sound heads 10, 12 and 14, constituting erasing, recording, and playback heads, respectively. The tape also passes over an idler guide pulley 16.

The tape is driven through the reproducing apparatus by means of a drive pulley 18 which frictionally engages the tape. The drive pulley may be driven by means of a capstan 20, which in turn is driven, by a speed reduction system 22, from a synchronous motor 24.

It is usually desired to drive the tape so that the indicia will pass a reference point at constant frequency even though the indicia have become separated by a somewhat greater distance in one portion of the tape than in another. For convenience, the indicia may be so spaced that, when the tape speed is 15″ per second, the frequency with which the indicia will pass a reference point will be 60 per second.

A control signal, for providing the information as to the actual frequency of passage of the indicia, is generated by directing a spot of light onto the back of the tape, from an exciter lamp 26 which may be supplied from a high frequency current source that will be described in more detail later. As the stripes pass beneath the exciter lamp, light reflected from the tape impinges upon the light sensitive element of a photocell 28. The photocell converts the light variations into an electrical signal of corresponding frequency. This signal is amplified by an amplifier 30.

The output from the amplifier drives a small clock motor 32. A second clock motor 34 is operated from a reference frequency source such as ordinary 60 C. P. S. line current. The shaft of the second motor is set to rotate in a direction counter to that of the first motor. The shafts of the two motors are connected and the housing of one of the motors, say the first motor 32, is mounted in a manner such that it is free to rotate a small amount. If either clock motor shaft tends to rotate faster than the other, the motor housing having the free mounting is caused to rotate.

As shown in more detail in Figure 2, the rotational torque of the free motor housing is used to move a pivoted lever arm 36 through a linking member 38. This varies the resistance of a potentiometer 40 which is part of the phase shift network 42 of a variable frequency oscillator 44 having a circuit which will be described in more detail later. The normal output frequency of the oscillator may also be 60 C. P. S. or some other frequency bearing a definite relation to that of the desired frequency of passage of the indicia 4.

The lever arm which varies the resistance of the potentiometer is set so that if the frequency difference detected by the differential; i. e., the two clock motors, has a positive value, that is, the frequency of the control signal is greater than the frequency of the standard, the output frequency of the variable frequency oscillator will be lowered. Conversely, if the detected frequency difference is negative, the setting of the potentiometer control is such as to raise the frequency of the oscillator.

The output of the oscillator is amplified by a power amplifier 46 of conventional type and the amplified output is then used to drive the synchronous electric motor 24. The rotational speed of the shaft of the tape drive motor will, of course, vary as the frequency of the oscillator 44 varies when the apparatus is under synchronous operation control.

Provision is made in the invention for automatically disconnecting the power amplifier 46 from the output of the variable frequency oscillator 44 during those periods in which the tape drive mechanism is starting or stopping. As will be more fully described later, a relay is provided with a moving contact 248 connected to the power amplifier. During operation at substantially normal playback speeds, the moving contact is connected to a terminal 252 having a lead to the variable frequency oscillator. During starting and stopping periods, the moving contact is automatically connected to terminal 250 having a lead to a source of reference frequency. During these periods, the tape drive motor is then driven directly from the reference frequency source.

The controlling action of the system may be summarized as follows. Suppose, for example, that the tape has stretched somewhat since the sound was recorded. The indicia 4 will then be spaced somewhat farther apart and, for a given linear velocity of the tape, the number of indicia per second passing the photocell will be lowered. This calls for a corresponding speed-up in the velocity of the tape so that the desired number of marks per second will again pass the photocell. The control signal from the photocell is fed to one of the clock motors 32 and the standard frequency signal is applied to the other clock motor 34 of the differential pair. The shaft of one motor tries to turn at a different rate than the shaft of the other but, being unable to do so, the freely mounted housing of the first motor 32 rotates instead. The motion of this rotation is communicated to the resistance-changing arm 36 of the potentiometer 40 which causes a change in the resistance and, consequently, a slight rise in the frequency of the oscillator 44. The raising of the oscillator frequency causes the rotational speed of the tape drive motor to increase slightly and the tape velocity is also increased proportionately until the indicia are again passing the photocell at the desired rate.

There will now be described a preferred embodiment of an electronic control circuit that may be used in the above described apparatus. With reference to Figure 2, principal portions or distinct subdivisions of the circuit have been indicated by enclosing each one in block shown by dotted outline. In general, the circuit comprises a power supply 48 for the exciter lamp 26, a preamplifier 50 for amplifying the varying potential appearing across the photocell 28, a frequency doubler circuit 52 which is only used if the tape is being operated at half the usual velocity, a clipper circuit 54 which limits the amplitiude of the output of pre-amplifier 50, an amplifier and shaper circuit 56, a relay control circuit 58, and the previously mentioned variable frequency oscillator circuit 44.

*Power supply for exciter lamp*

The power supply 48 for the exciter lamp comprises a high frequency oscillator of conventional tuned grid-tuned plate type. This oscillator comprises a tetrode vacuum tube 60, which may be a 6V6. The primary winding 62 of a transformer 64 is connected in the anode circuit of the vacuum tube. A capacitor 66 is connected in parallel with the inductance in the anode circuit. A capacitor 67 is also connected between the primary winding and ground. A screen by-pass capacitor 68 is also connected between the screen grid of the vacuum tube and ground. The anode voltage of the tube is furnished through a lead 70 from a 320 v. B+ supply and connected between one side of capacitor 66 and the primary winding of the transformer. A screen dropping resistor 72 is connected between the screen grid of the tube and the B+ supply.

The transformer is provided with two secondary windings. One of the secondary windings 74 is connected to the exciter lamp 26. The other secondary winding 76 is used to feed back voltage to the control grid of the tube. In series with the grid but in parallel with each other in the feedback circuit are a capacitor 78 and a grid leak resistor 80.

A D.-C. voltage is taken from the control grid of the vacuum tube to supply photocell 28 through a lead 82. The photocell used in this circuit arrangement is of the variable resistance type, the resistance varying with the intensity of light received by the sensitive element. The photocell may be connected between the grid lead 82 and ground. A capacitor 84 connected in the feedback circuit and a resistor 86 connected between control grid and photocell, filter A.-C. potential from the photocell supply. A load resistor 88 is also connected in series with the photocell.

The oscillator circuit shown can be used to generate a frequency of about 24 kc. The frequency of the ripple voltage is high enough to prevent interference.

Instead of using a high frequency supply for the exciter lamp, a D.-C. supply may be used with equal success. Also, photocell voltage may be obtained from the regular power supply if proper precautions for decoupling are used.

*Pre-amplifier*

The output of the photocell is fed into a conventional pentode pre-amplifier stage 50. The vacuum tube pentode 90 may be a 6AU6. A coupling capacitor 92 is connected between the output of the exciter supply and the control grid 94. A grid resistor 96 is connected between the control grid and ground.

The anode of the tube 90 is connected to a 150 v. B+ supply. A plate load resistor 98 is connected in series with the anode. A screen grid dropping resistor 100 is connected between the B+ supply and the screen grid of the tube. A by-pass capacitor 102 is connected between the screen grid and ground. A cathode resistor 104 is connected between the cathode and ground and a by-pass capacitor 106 is connected in parallel with the cathode resistor.

Output of the pre-amplifier stage is fed through a coupling capacitor 108 to a manual switch 110 which enables either one of two circuit paths to be selected. A low-pass filter capacitor 111 is connected between the switch and ground. If it is desired to operate the tape at a relatively low speed, say 7½ inches/second, which is only ½ of its usual operational speed, the output of the pre-amplifier stage is connected to terminal A of the switch so that the signal goes through the frequency-doubling circuit 52. This brings the signal frequency back up to the standard frequency. If the tape is being operated at "normal" speed, the output of the pre-amplifier is fed to contact B of the switch, whereupon it goes through by-pass lead 112 directly to the clipper circuit 54.

*Frequency doubling circuit*

Part of the frequency doubling circuit comprises a dual triode vacuum tube 114 which may by a 6J6. One-half 116 of this tube serves as an amplifier stage and the other half 118 serves as an isolation circuit. The grid 120 of the first half is connected to the signal input from the preceding stage through a gain control variable resistor 122. The cathode 124 of the amplifier portion of the tube is biased through a cathode resistor 126, connected between the cathode and ground. A by-pass capacitor 128 is connected in parallel with the cathode resistor. The first anode 130 of the tube is connected to the grid 132 of the second half of the tube through a coupling capacitor 134. The anode of the first half of the tube is connected to a 320 v. B+ supply through a load resistor 136, and the anode of the second half of the tube is connected to the B+ supply through a load resistor 138. A grid resistor 140 is connected between the second grid 132 and a point on a voltage divider network between the cathode and ground. The voltage divider network comprises two series-connected resistors 142 and 144 between which the lead including the grid resistor 140 is connected.

The next stage of the frequency doubler circuit is a conventional full wave rectifier of the bridge type. The rectifier performs the function of doubling the output frequency of the preceding stage. The rectifier comprises two dual diode vacuum tubes 146 and 148 which may be 6AL5's. Each of the cathodes of the first tube is directly connected to an anode of the second tube.

The anode of the isolation stage is coupled to a point between a cathode of the first dual diode tube and the connected anode of the second dual diode tube through a coupling capacitor 150. The other anode-cathode pair of the two dual diodes is coupled to the voltage divider network of the preceding stage at a point between resistors 142 and 144, through capacitor 152. The cathodes of the second dual diode are provided with a bleeder resistor 154 which is connected between the cathodes and ground. The anodes of the first dual diode are also provided with a bleeder resistor 156 connected between both anodes and the cathodes of the second dual diode tube.

*Clipper circuit*

The output of the frequency doubling stage is coupled to the next stage through a coupling capacitor 158. The next stage comprises a conventional type clipper circuit for limiting the amplitude of the output of the frequency doubling stage. This limiting action is needed because magnetic tape obtained commercially has printed indicia which may vary considerably in width and reflectivity. Thus, the signal picked up from the tape may vary in amplitude over a wide range making some form of limiter necessary. The clipper circuit comprises a dual triode vacuum tube 160 which may be a 6J6. The tube has two sets of elements 162 and 164. The output from the preceding stage is applied to the grid 166 of the first half of the tube. A grid resistor 168 is connected between this grid and ground. Both cathodes of the tube are tied together and provided with two cathode resistors 170 and 172 connected in series between the cathodes and ground. These resistors constitute a potential divider network. The second grid 174 is connected between the resistors of this network through a grid resistor 176. A grid by-pass capacitor 178 is connected directly between the second grid 174 and ground. Both anodes of the dual triode are connected to a 150 v. B+ supply, the second anode being connected to the supply through a plate load resistor 180.

*Amplifier and shaper circuit*

The output of the clipper circuit is coupled to the next succeeding stage through a coupling capacitor 182. The next portion of the circuit is an amplifier and shaping circuit 56 which both amplifies the output of the clipper circuit and shapes the waveform to nearly that of a sine wave. The first stage of this portion constitutes a voltage amplifier and shaper. This first stage comprises a triode vacuum tube 184 which may be a 6C5. The output from the preceding stage is fed to the grid 186 of this tube through a grid resistor 188. Another grid resistor 190 is also connected between this grid and ground in series with the other grid resistor 188. A capacitor 192 is connected between the grid 186 and ground in parallel with the second grid resistor 190. This capacitor is a low pass filter serving to effect a partial rounding of the square wave form of the preceding stage.

The cathode of the tube 184 is provided with conventional cathode biasing resistor 194 and by-pass capacitor 196 in parallel with each other. The anode of this tube is connected to a 150 v. B+ supply through a plate load resistor 198.

The output of the voltage amplifier and shaper stage is coupled to the next stage through a coupling capacitor 200. A low pass filter capacitor 201 is connected between this capacitor and ground. The next stage constitutes a power amplifier and shaper circuit. The power amplifier comprises a beam power vacuum tube 202 which may be a 6L6. The output of the preceding stage is fed to the control grid 204 of this tube through a variable grid resistor 206, which resistor has one side connected to ground. The potential applied to the grid through the resistor 206 may be varied manually so that this serves as a gain control. A low pass filter capacitor 201 is connected in parallel with the gain control resistor. The filter capacitor further shapes the signal wave form so that it becomes more nearly that of a sine wave.

The cathode of the beam power tube is provided with conventional cathode resistor 208 and by-pass capacitor 210 arranged in parallel. The screen grid of the power tube is connected to a 200 v. B+ supply and also coupled to ground through a by-pass capacitor 212. The anode of the power tube is connected to a 320 v. B+ supply. In the output of this tube, there is also the primary 214 of an impedance-matching transformer 216. The secondary 218 of the transformer is connected across the winding of one of the clock motors 32 through a relay 220 and a manual switch 222. In order to tune the inductance of the clock motor, a capacitor 224 is connected in parallel with the transformer secondary winding and the clock motor winding. Thus, when both the relay contacts and the switch are in closed position, the clock motor 32 is driven by the output of amplifier circuit 56 and controlled by a signal derived from the photocell.

*Relay control circuit*

Output is taken from the secondary 218 of the transformer 216 and applied to a relay control circuit 58, through a coupling capacitor 226. The relay control circuit may include a dual triode vacuum tube 228 which may be a 6SN7, having two sets of elements 230 and 232. The first half 230 of the tube is operated as a diode with grid and anode operating at the same potential. Signal from the preceding stage is fed to the cathode of the first half of the tube through a gain control resistor 234 having one side grounded. The cathode lead, which includes a coupling capacitor 236, is arranged to make variable contact with the gain control resistor. The capacitor 236 and resistor 234 constitute a frequency-selective device. A bleeder resistor 237 is connected between the cathode and ground.

The diode half of the 6SN7 provides bias for cutting off the other half of the tube under predetermined conditions. When the frequency of the signal being fed to the diode stage rises to the predetermined value, the output of the diode biases the second half of the tube to cut off. The second half of the tube has a grid connected to the anode of the first half through a resistor 238. This grid is also coupled to ground through a filter capacitor 240. A second filter capacitor 242 is connected between the first anode and ground. The anode of the second half of the tube is connected to a winding of a relay 220. The anode is also connected through the relay winding to a 150 v. B+ supply. A filter capacitor 246 is in parallel with the relay winding.

Output from the second half of the triode controls the relay 220, which is energized as long as the triode is conducting. Biasing of the grid to cut-off therefore deenergizes the relay. This part of the circuit constitutes an automatic switch for disconnecting the normally connected control circuit from the capstan motor. Further explanation of the function of this part of the control circuit in the entire driving apparatus will now be given.

A variable resistance photocell is an amplitude device. Therefore, full voltage is developed as soon as the tape-driving capstan starts to move. The high-pass network helps prevent the signal voltage from reaching full value at the diode 230 until a predetermined frequency has been reached.

When the signal frequency and voltage become sufficiently high, the diode biases the triode to cutoff. This de-energizes the relay. In this way, while the relay remains energized, the capstan motor 24 is operated from the reference frequency source until it reaches normal speed. Then, the relay is de-energized, which starts both clock motors and switches the signal for the capstan motor from the reference frequency source to the variable frequency oscillator 44.

*Relay operation*

The relay has three sets of contacts. The first set 246 has a moving contact 248 connected to the output of the power amplifier 46, which drives the tape-driving motor 24, a first fixed terminal 250 connected to a reference frequency source of 60 cycle current (not shown) and a second fixed terminal 252 connected to a lead 254 to the variable frequency oscillator 44. The second set of contacts 256 comprises a moving contact 258 connected to one of the clock motors 34, a blank fixed terminal 260, and another fixed terminal 262 connected to a reference frequency source. The third set of contacts 264 comprises a moving contact 266 connected to the other of the two clock motors 32, a terminal 268 connected to ground through a resistor 269, and a terminal 270 connected to the output of amplifier circuit 56.

In Figure 2, the relay is shown in de-energized state. In this condition, the variable frequency oscillator 44 is connected through the relay terminal 252 to the power amplifier 46 which supplies power to the tape-driving motor 24. One of the clock motors 34 is connected to the reference frequency source (not shown), and the other clock motor 32 is connected through terminal 270 to the output of the amplifier 56, which is being fed with the signal from photocell 28, the frequency of the signal being dependent upon the number of indicia per second passing the signal pick-up point.

As previously stated, during the periods of stopping and starting the tape-driving mechanism, the relay is energized. In this condition, the lead 248 to the power amplifier 46 is connected to the reference frequency source through the terminal 250. Both clock motors 32 and 34 are disconnected from their power supplies since the contacts 258 and 266 are connected with the terminals 260 and 268, respectively.

*Variable frequency oscillator*

The variable frequency oscillator 44 comprises a triode vacuum tube 272 which may be a 6SF5. The anode of this tube is connected to a 320 volt B+ supply through a load resistor 274 and a filter resistor 276. The cathode is provided with a conventional cathode resistor 277 connected between the cathode and ground and a conventional bypass capacitor 278 connected in parallel with the cathode resistor. The grid of the tube is connected to a series of high-pass, phase shifting networks 42. This series comprises three separate networks, each comprising a resistor and capacitor. The three resistors 280, 282, and 284 are connected in parallel to ground. The capacitors 286, 288, 290 are series connected between the grid and the anode of the tube. One of the resistors 284 of the network series is provided with a variable control operated from a lever arm 36 attached to the casing of one of the clock motors 32. A filter capacitor 292 is also provided between the anode lead and ground. This capacitor is connected between the load resistor 274 and the filter resistor 276. A coupling capacitor 294 is also provided between the output lead of the anode and the relay terminal 252.

As previously explained, the variable frequency oscillator is adjusted to have a normal mean output signal of 60 C. P. S. or, if other standards are being used, the normal output signal would have a frequency corresponding to either the normal number of indicia passing the reference point per second or some fixed ratio thereto. For example, the frequency of passage of the indicia might be 30 per second and the normal oscillator output might be 60 per second. The frequency of the oscillator is preferably able to be varied by about $\pm 1\frac{1}{2}\%$.

As also previously explained, a decrease in the frequency of passage of the indicia causes a corresponding increase in the output frequency of the oscillator 44 while an increase in frequency of the indicia causes a corresponding decrease in output of the oscillator. Thus, a control system for a tape drive apparatus has been provided which has proved capable of controlling the playback time of a half-hour of tape recording to within less than 0.3 of a second.

Although the apparatus as described is especially adapted for synchronous operation of a tape driving mechanism in which the tape has some kind of visible indicia printed on one of its faces, it may be utilized for non-synchronous driving of tape having no indicia. There is no particular advantage in utilizing the invention for driving tape without indicia but one need then not have two different tape recording machines to handle the two kinds of tape. This, in itself, is greatly advantageous.

With slight modification, the apparatus may also be used to drive a recording medium such as tape or wire in which the reference signal is recorded as spaced pulses having a frequency outside the audio frequencies recorded on the medium. In this case, the photocell in replaced by a suitable pick-up head and circuit for detecting the recorded pulses and this signal is used to drive the clock motor 32.

A list of suitable circuit constants which may be used to construct an operative circuit as above described is as follows:

Power supply for exciter lamp and photocell:

| Capacitors (values in microfarads)— | Resistors (values in units of 1,000 ohms unless otherwise specified)— |
|---|---|
| C66—.003 | R72—33 |
| C67—.1 | R80—56 |
| C68—.01 | R86—330 |
| C78—180 | R88—1.7 megohms |
| C84—8 | |
| Pre-amplifier—50— | |
| C92—.03 | R96—270 |
| C102—.25 | R98—240 |
| C106—20 | R100—390 |
| C108—.05 | R104—1,500 ohms |
| Frequency doubling circuit—52— | |
| C111—.006 | R122—300 |
| C128—10 | R126—8.2 |
| C134—.05 | R136—240 |
| C150—.05 | R138—68 |
| C152—.05 | R140—1.2 megohms |
| C158—.1 | R142—3.3 |
| | R144—62 |
| | R154—150 |
| | R156—62 |

Power supply for exciter lamp and photocell—Continued

| | |
|---|---|
| Clipper circuit—54— | R168—470 |
| C178—1.0 | R170—470 ohms |
| C182—.5 | R172—3.3 |
| | R176—470 |
| | R180—180 |
| Amplifier and shaper circuit—56— | R188—47 |
| C192—.15 | R190—15 |
| C196—.25 | R194—12 |
| C200—.008 | R198—470 |
| C201—.001 | R206—500 |
| C210—20 | R208—270 ohms |
| C212—20 | |
| Relay control circuit—58— | |
| C226—.03 | R234—300 |
| C236—.01 | R237—1.2 megohms |
| C240—.15 | R238—1.2 megohms |
| C242—.05 | |
| Variable frequency oscillator—44— | R274—82 |
| C278—25 | R276—15 |
| C286—.01 | R277—1.2 |
| C288—.02 | R280—82 |
| C290—.02 | R282—56 |
| C292—20 | R284—50 |
| C294—.002 | |

I claim as my invention:

1. Apparatus for controlling the velocity of a recording medium carrying spaced indicia, such that said indicia pass a given point at a desired constant frequency, comprising means responsive to the movement of said indicia for generating a control signal having a frequency proportional to the rate of passage of said indicia, a standard signal source having a frequency related to said desired frequency, means for continuously detecting any difference between the frequency of said signal and of said standard source, said detecting means comprising a first motor having a housing and a shaft and a second motor having a housing and a shaft, the shafts of said first and second motors being directly coupled together for simultaneous rotation, the housing of said first motor being fixedly mounted, the housing of said second motor being rotatably mounted, said first motor being energized from said standard source, said second motor being energized from said control signal whereby differences in the frequency of said standard source and said control signal cause a corresponding rotary movement of the housing of said second motor, a variable frequency oscillator having a normal output frequency bearing a predetermined relationship to that of said standard source, means responsive to the movement of said rotatable housing for varying the frequency of said oscillator, and means responsive to the output frequency of said oscillator for driving said recording medium.

2. Apparatus for controlling the velocity of a recording medium carrying spaced indicia such that said indicia pass a given point at a desired constant frequency, comprising means responsive to movement of said indicia for generating an alternating control signal, a standard frequency source, means for detecting differences between the frequency of said control signal and of said standard source, a variable frequency oscillator, means responsive to frequency differences detected by said detecting means for varying the frequency of said oscillator, means for driving said recording medium, and means responsive to the frequency of said control signal for selectively connecting said driving means to said oscillator when said signal has a frequency approximately equal to said desired frequency and to said standard source when said signal frequency is substantially less than said desired frequency.

3. Apparatus for controlling the velocity of a recording medium carrying spaced indicia such that said indicia pass a given point at a desired constant frequency, comprising means responsive to the movement of said indicia for generating a control signal having a frequency proportional to the rate of passage of said indicia, a standard signal source having a frequency equal to said desired frequency, means for continuously comparing the frequencies of said control signal and of said standard, said comparing means including a first motor having a housing and a shaft and a second motor having a housing and a shaft, the shafts of said motors being directly coupled together for simultaneous rotation, the housing of said first motor being fixedly mounted, the housing of said second motor being rotatably mounted, said first motor being energized from said standard source, said second motor being energized from said control signal whereby differences in the frequency of said standard source and of said control signal cause a corresponding rotational movement of the housing of said second motor, a variable frequency oscillator having a frequency normally equal to that of said standard, means responsive to the movement of the housing of said second motor for varying the frequency of said oscillator, and means responsive to the output frequency of said oscillator for driving said recording medium.

4. Apparatus for controlling the velocity of a medium carrying spaced indicia such that said indicia pass a given point at a desired constant frequency, comprising means responsive to the movement of said indicia for generating a control signal having a frequency proportional to the rate of passage of said indicia, a standard frequency source having a frequency equal to said desired frequency, means for continuously comparing the frequencies of said control signal and of said standard, a variable frequency oscillator having a frequency normally equal to that of said standard, means for driving said recording medium, and means responsive to the frequency of said control signal for selectively energizing said driving means from said oscillator when the frequency of said control signal is approximately equal to that of said standard source and from said standard source when the frequency of said control signal is substantially less than that of said standard source.

5. Apparatus according to claim 4 in which said control signal generating means includes a variable resistance photosensitive device.

6. The invention as set forth in claim 1 and characterized by the addition of selectively operable frequency multiplier means interposed between said signal generating means and said detecting means for selectively multiplying the frequency of the generated signal when it is a fractional part of that of said standard source whereby the frequency of said control signal may be made approximately equal to that of said standard source.

DALLAS R. ANDREWS.

REFERENCES CITED

The following references are of record in the file of this patent:

UNITED STATES PATENTS

| Number | Name | Date |
|---|---|---|
| 1,731,264 | Potter | Oct. 15, 1929 |
| 1,907,132 | Thurston | May 2, 1933 |
| 1,976,355 | Mees et al. | Oct. 9, 1934 |
| 2,382,847 | Baumann | Aug. 14, 1945 |
| 2,399,421 | Artzt | Apr. 30, 1946 |